(12) United States Patent
Misaizu

(10) Patent No.: US 12,447,570 B2
(45) Date of Patent: Oct. 21, 2025

(54) FLANGE

(71) Applicant: DISCO CORPORATION, Tokyo (JP)

(72) Inventor: Masanori Misaizu, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 485 days.

(21) Appl. No.: 18/172,591

(22) Filed: Feb. 22, 2023

(65) Prior Publication Data

US 2023/0271285 A1 Aug. 31, 2023

(30) Foreign Application Priority Data

Feb. 25, 2022 (JP) ................................ 2022-028461

(51) Int. Cl.
  *B23Q 11/10* (2006.01)
  *B23Q 3/12* (2006.01)

(52) U.S. Cl.
  CPC ............... *B23Q 3/12* (2013.01); *B23Q 11/10* (2013.01)

(58) Field of Classification Search
  CPC .......... B23Q 3/12; B23Q 11/10; B28D 5/022; B28D 5/0076; B28D 5/0058; H01L 21/67092; B24B 57/02; B24B 27/06
  USPC ....... 408/1, 8–15, 56, 67, 76, 115, 145, 224, 408/230
  See application file for complete search history.

(56) References Cited

U.S. PATENT DOCUMENTS

| | | | | |
|---|---|---|---|---|
| 1,385,732 A | * | 7/1921 | Taylor | B23D 47/08 408/136 |
| 1,888,895 A | * | 11/1932 | Verkuil | B28D 5/022 407/45 |
| 2,372,699 A | * | 4/1945 | Wiken | B23Q 11/10 83/100 |
| 2,378,070 A | * | 6/1945 | Eastwood | B24D 5/10 451/450 |
| 3,483,858 A | * | 12/1969 | Jansen | B23D 47/005 451/450 |
| 3,566,547 A | * | 3/1971 | Lonsberger et al. | B24B 45/00 451/342 |
| 4,393,626 A | * | 7/1983 | Schroer | B24D 5/16 409/234 |
| 4,870,946 A | * | 10/1989 | Long | B23D 59/025 83/171 |

(Continued)

FOREIGN PATENT DOCUMENTS

| | | | | |
|---|---|---|---|---|
| GB | 2312860 A | * | 11/1997 | B25F 5/026 |
| JP | 2016137528 A | * | 8/2016 | |

(Continued)

*Primary Examiner* — Robert F Long
(74) *Attorney, Agent, or Firm* — GREER BURNS & CRAIN, LTD.

(57) ABSTRACT

Recessed spaces are formed along a circumferential direction on the front side and the rear side of an axial direction of a cutting blade. At the time of cutting a workpiece, a cutting liquid supplied from a cutting liquid supply nozzle to an outer circumferential part of the cutting blade enters the recessed spaces and is splashed back by an outer circumferential surface, to be supplied to a cutting region of an upper surface of the workpiece. As a result, the cutting liquid can efficiently be made to flow toward and collide against burrs of electrodes, the burrs being generated by cutting, so that the burrs can be separated and removed from the upper surface of the workpiece.

1 Claim, 9 Drawing Sheets

(56) References Cited

U.S. PATENT DOCUMENTS

| | | | | |
|---|---|---|---|---|
| 4,979,853 | A * | 12/1990 | Field | B23B 31/305 |
| | | | | 279/2.07 |
| 5,395,187 | A * | 3/1995 | Slesinski | B23B 49/02 |
| | | | | 408/72 R |
| 6,042,461 | A * | 3/2000 | Pearson | B23D 45/042 |
| | | | | 451/353 |
| 6,105,567 | A * | 8/2000 | Sun | H01L 21/78 |
| | | | | 451/450 |
| 6,779,953 | B2 * | 8/2004 | Suzuki | B23B 29/03432 |
| | | | | 409/230 |
| 6,827,074 | B2 * | 12/2004 | Gardner | B27B 5/32 |
| | | | | 125/25 |
| 6,855,039 | B2 * | 2/2005 | Vidmore | B23D 61/10 |
| | | | | 451/342 |
| 7,666,070 | B2 * | 2/2010 | Weber | B27B 5/32 |
| | | | | 451/353 |
| 9,555,554 | B2 * | 1/2017 | Thorson | B24B 23/04 |
| 10,974,364 | B2 * | 4/2021 | Sekiya | H01L 21/67092 |
| 2005/0051913 | A1 * | 3/2005 | Yoshida | B28D 5/007 |
| | | | | 261/76 |
| 2005/0105975 | A1 * | 5/2005 | Wood | B23Q 11/0046 |
| | | | | 408/67 |
| 2008/0232915 | A1 * | 9/2008 | Reinhardt | B23B 51/108 |
| | | | | 408/230 |
| 2009/0123244 | A1 * | 5/2009 | Buettiker | B23D 77/006 |
| | | | | 408/233 |
| 2010/0086371 | A1 * | 4/2010 | Mergenthaler | B23B 47/34 |
| | | | | 408/233 |
| 2012/0308323 | A1 * | 12/2012 | Gardner | B23Q 11/1076 |
| | | | | 409/117 |
| 2015/0075833 | A1 * | 3/2015 | Dotan | B23Q 5/06 |
| | | | | 173/218 |
| 2015/0321263 | A1 * | 11/2015 | Thelin | B23B 27/10 |
| | | | | 407/11 |
| 2016/0339554 | A1 * | 11/2016 | Angel | B23Q 17/24 |
| 2017/0209974 | A1 * | 7/2017 | Angel | B23Q 17/0971 |

FOREIGN PATENT DOCUMENTS

| | | | | | |
|---|---|---|---|---|---|
| JP | 2016198869 | A | * | 12/2016 | |
| JP | 2019096759 | A | | 6/2019 | |
| JP | 2021013966 | A | * | 2/2021 | |
| JP | 2021013968 | A | * | 2/2021 | |
| JP | 2022028461 | A | * | 2/2022 | H01J 37/32715 |
| JP | 2025096779 | A | * | 6/2025 | |
| WO | WO-2025131551 | A1 | * | 6/2025 | B23Q 3/12 |

* cited by examiner

FLANGE

BACKGROUND OF THE INVENTION

Field of the Invention

The present invention relates to a flange for fixing a cutting blade to a spindle in a cutting apparatus.

Description of the Related Art

Heretofore, in a cutting apparatus for cutting a workpiece to divide the workpiece into individual semiconductor chips, it has been known to continuously supply cutting water to a cutting blade during a cutting step of cutting the workpiece. With the cutting water supplied continuously as described above, processing heat generated due to the cutting is cooled to prevent processing quality from being deteriorated, and cutting swarf generated due to the cutting is washed away from the workpiece.

However, it is difficult to sufficiently remove the cutting swarf on the workpiece by only the cutting water supplied during the cutting, and cleaning of the workpiece by use of an apparatus exclusively for cleaning, such as a spinner cleaning apparatus, is conducted after the cutting.

Meanwhile, in a case where the workpiece is a package substrate such as a chip scale package (CSP) substrate, cutting of planned cutting lines by the cutting blade results in that a plurality of metallic electrodes formed across the planned cutting lines are cut. Metallic burrs are generated upon cutting of the metallic electrodes, and the presence of the burrs on the individual package divided may cause mounting failure when the package is mounted later.

In regard to this point, Japanese Patent Laid-open No. 2019-096759 discloses cleaning of the package substrate that has undergone cutting and removal of the burrs generated due to the cutting.

SUMMARY OF THE INVENTION

It is demanded to enhance more the effect of the cleaning to more securely ensure that the cutting swarf and the burrs would not be left.

In addition, if the cutting swarf and the burrs can be more securely removed from the workpiece by the cutting water supplied to the cutting blade during cutting, shortening of the time of cleaning for the purpose of removing the cutting swarf and the burrs can be realized.

Accordingly, it is an object of the present invention to provide a flange that is capable of making it possible to shorten the time of cleaning for the purpose of removing cutting swarf and burrs.

In accordance with an aspect of the present invention, there is provided a flange for fixing a cutting blade to a spindle in a cutting apparatus that includes the spindle with the cutting blade fixed to a tip thereof, the cutting blade having an annular cutting edge, a holding unit which holds a workpiece to be cut by the cutting blade fixed to the tip of the spindle, and a cutting liquid supply nozzle which supplies a cutting liquid to the cutting blade during cutting of the workpiece held by the holding unit. The flange includes a front flange and a rear flange that clamp the cutting blade therebetween. The front flange has a first outer circumferential part smaller in diameter than the cutting blade and a second outer circumferential part smaller in diameter than the first outer circumferential part, a clamping surface making contact with a front surface of the cutting blade is formed at an end face of the second outer circumferential part on a side opposite to the first outer circumferential part, and a diameter of an outer circumferential surface of the second outer circumferential part is configured to be the same in an axial direction of the front flange or is configured to be enlarged as a distance from the cutting blade increases, and the rear flange has a first outer circumferential part smaller in diameter than the cutting blade and a second outer circumferential part smaller in diameter than the first outer circumferential part, a clamping surface making contact with a rear surface of the cutting blade is formed at an end face of the second outer circumferential part on a side opposite to the first outer circumferential part, and a diameter of an outer circumferential surface of the second outer circumferential part is configured to be the same in an axial direction of the rear flange or is configured to be enlarged as a distance from the cutting blade increases, whereby, at a time when the cutting blade is clamped between the front flange and the rear flange, recessed spaces are formed on both sides of the cutting blade along a circumferential direction of the front flange and the rear flange, and the cutting liquid supplied from the cutting liquid supply nozzle to the cutting blade is splashed back in the recessed spaces to be supplied to a cutting region of an upper surface of the workpiece.

According to the present invention, the recessed spaces are formed on both sides of the cutting blade along the circumferential direction, so that the cutting liquid enters into the recessed spaces and is hardly scattered sideways. As a result, a larger amount of the cutting liquid can be supplied toward the cutting region where cutting by the cutting blade is conducted, and the burrs can be separated and removed more effectively during cutting. In addition, shortening of the time of cleaning for the purpose of removing of burrs and cutting swarf can be realized.

The above and other objects, features and advantages of the present invention and the manner of realizing them will become more apparent, and the invention itself will best be understood from a study of the following description and an appended claim with reference to the attached drawings showing some preferred embodiments of the invention.

DETAILED DESCRIPTION OF THE PREFERRED EMBODIMENTS

Figure 1:
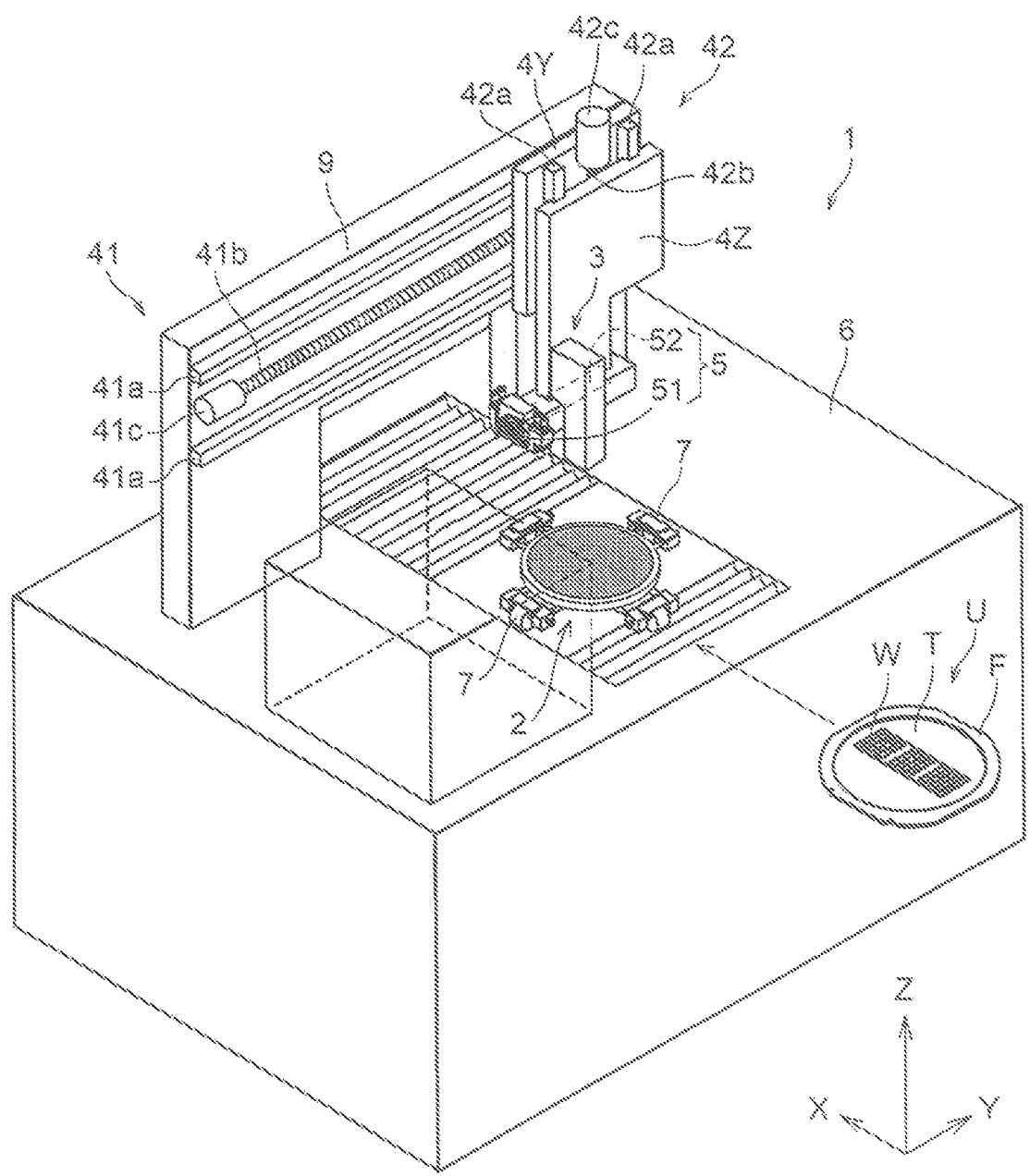
FIG. 1 is a perspective view depicting an example of a cutting apparatus used for carrying out the present invention.

Embodiments of the present invention will be described below with reference to the drawings. FIG. 1 is a perspective view depicting an example of a cutting apparatus 1 used for carrying out the present invention.

As illustrated in FIG. 1, the cutting apparatus 1 is for cutting a plate-shaped workpiece W such as a package substrate by a cutting unit 5. The cutting apparatus 1 includes a holding unit 2, an imaging unit 3, moving mechanisms (a Y-axis moving mechanism 41 and a Z-axis moving mechanism 42), and the cutting unit 5. Note that the workpiece W may be a semiconductor wafer, an optical device wafer, a plate-shaped inorganic material substrate, a plate-shaped ductile material, or the like, other than the package substrate.

The holding unit 2 includes a disk-shaped table, with a horizontal holding surface formed at an upper surface thereof. The holding surface is formed of a porous material, and is connected to an unillustrated suction source to generate a negative pressure, whereby the workpiece W is held under suction by the holding surface. The holding unit 2 is moved in an X-axis direction by an unillustrated X-axis moving mechanism provided in a base 6, thereby putting the workpiece W into processing feeding relative to the cutting unit 5.

In the periphery of the holding unit 2, there are provided a plurality of clamps 7 for clamping an annular frame F to which the workpiece W is fixed. The workpiece W is fixed to the annular frame F through a tape T, and is handled as a frame unit U. Note that the workpiece W is held under suction by the holding unit 2 through the tape T, or may be directly held by a jig table in a holding unit having the jig table.

The cutting unit 5 includes a spindle 52 driven by an unillustrated motor and a cutting blade 51 fixed to a tip of the spindle 52. The cutting blade 51 is, for example, a circular grindstone in which abrasive grains of artificial diamond are held by a bonding material.

The cutting unit 5 is moved in a Y-axis direction and a Z-axis direction by the Y-axis moving mechanism 41 and the Z-axis moving mechanism 42. The Y-axis moving mechanism 41 supports the cutting unit 5 in such a manner that the cutting unit 5 can be moved in the Y-axis direction (corresponding to an index feeding direction) relative to the base 6. The Z-axis moving mechanism 42 supports the cutting unit 5 in such a manner that the cutting unit 5 can be moved in the Z-axis direction (corresponding to a cutting-in feeding direction) relative to the base 6.

The Y-axis moving mechanism 41 includes a pair of guide rails 41a that are additionally provided on a front surface of a gate-like column 9 and extend in parallel to the Y-axis direction, a ball screw 41b disposed between the guide rails 41a, and a motor 41c fixed to one end of the ball screw 41b. The ball screw 41b is connected to a Y-axis moving plate 4Y through an unillustrated nut. When the ball screw 41b is rotated by the motor 41c, the Y-axis moving plate 4Y is moved in the Y-axis direction along the guide rails 41a.

The Z-axis moving mechanism 42 includes a pair of guide rails 42a that are additionally provided on a front surface of the Y-axis moving plate 4Y and extend in parallel to the Z-axis direction, a ball screw 42b disposed between the guide rails 42a, and a motor 42c fixed to one end of the ball screw 42b. The ball screw 42b is connected to a Z-axis moving plate 4Z through an unillustrated nut. When the ball screw 42b is rotated by the motor 42c, the Z-axis moving plate 4Z is moved in the Z-axis direction along the guide rails 42a. At a lower end part of the Z-axis moving plate 4Z, there are fixed the imaging unit 3 and the cutting unit 5.

The imaging unit 3 images the workpiece W before cutting, for adjusting alignment of the cutting unit 5 in relation to planned dividing lines (streets) on the workpiece W. The imaging unit 3 is, for example, a camera using a charge coupled device (CCD) image sensor or the like.

Figure 2A:
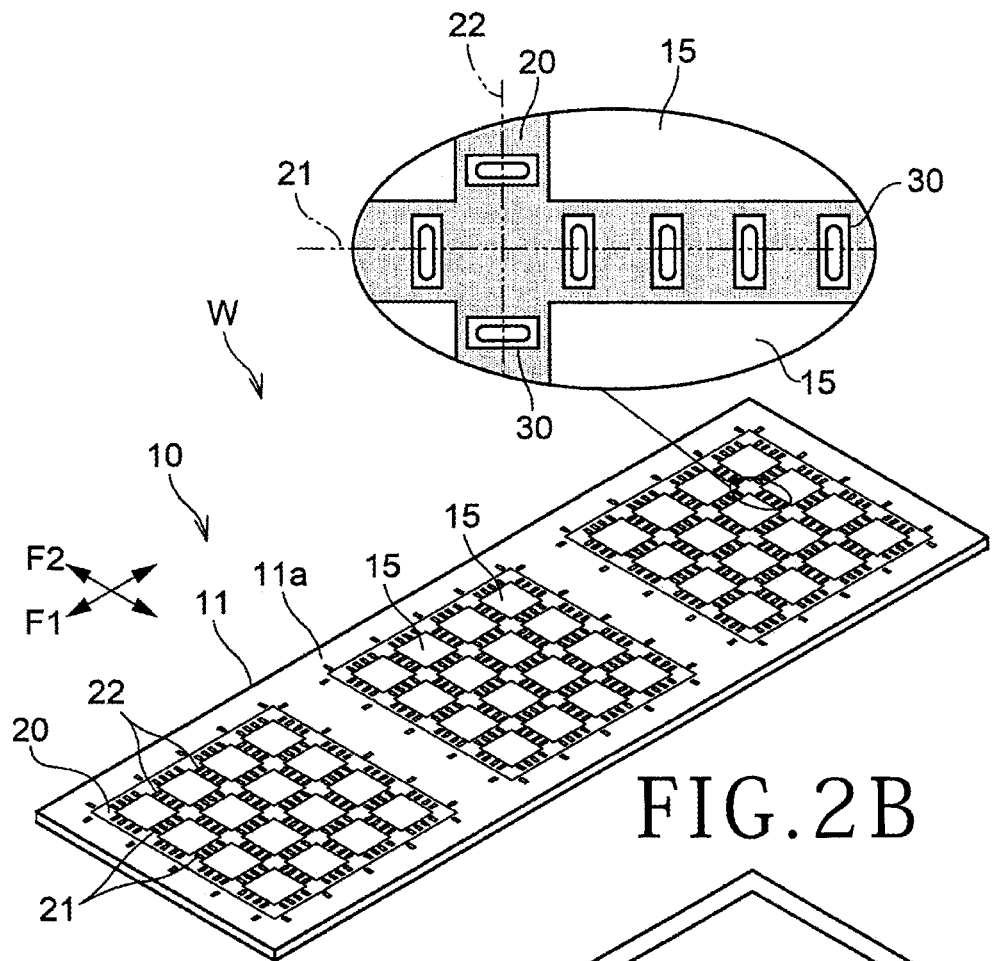
FIG. 2A is a front surface side perspective view depicting a configuration of a package substrate which is an example of workpiece.

FIG. 2A is a front surface side perspective view depicting a configuration of a package substrate 10 which is an example of the workpiece W. On the package substrate 10, a plurality of first streets 21 extending in a first direction F1 of a front surface 11a of a substrate 11 and a plurality of second streets 22 extending in a second direction F2 orthogonal to the first streets 21 are set in a grid pattern.

Figure 2B:
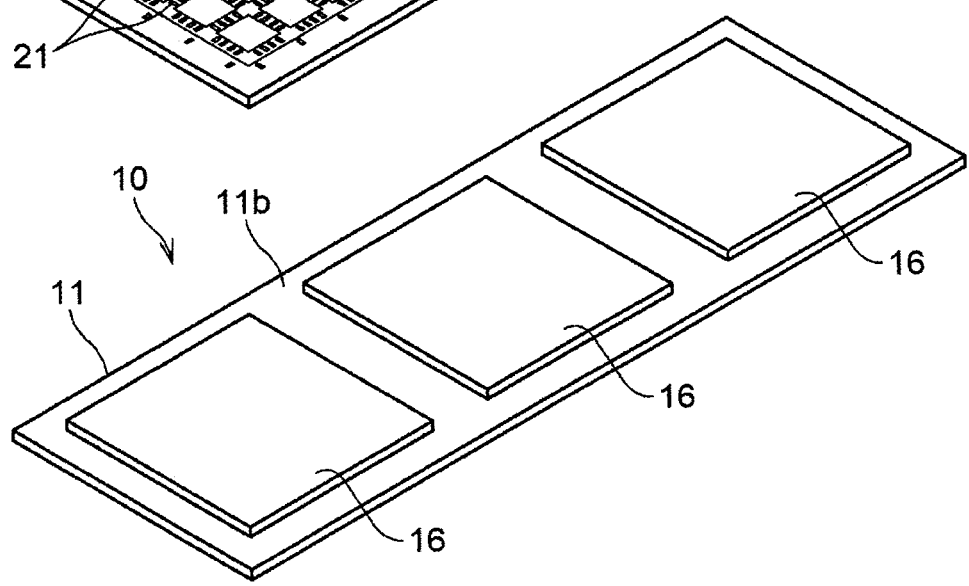
FIG. 2B is a rear surface side perspective view depicting the configuration of the package substrate.

On a back surface 11b of the substrate 11 in mounting areas 15 partitioned by the first streets 21 and the second streets 22, unillustrated semiconductor device chips are mounted, and are sealed with a synthetic resin 16 as depicted in FIG. 2B.

On the front surface 11a side of the substrate 11, the streets 21 and 22 are set between the mounting areas 15, and a plurality of electrodes 30 are disposed at intervals in such a manner as to cross the streets 21 and 22.

Figure 3:
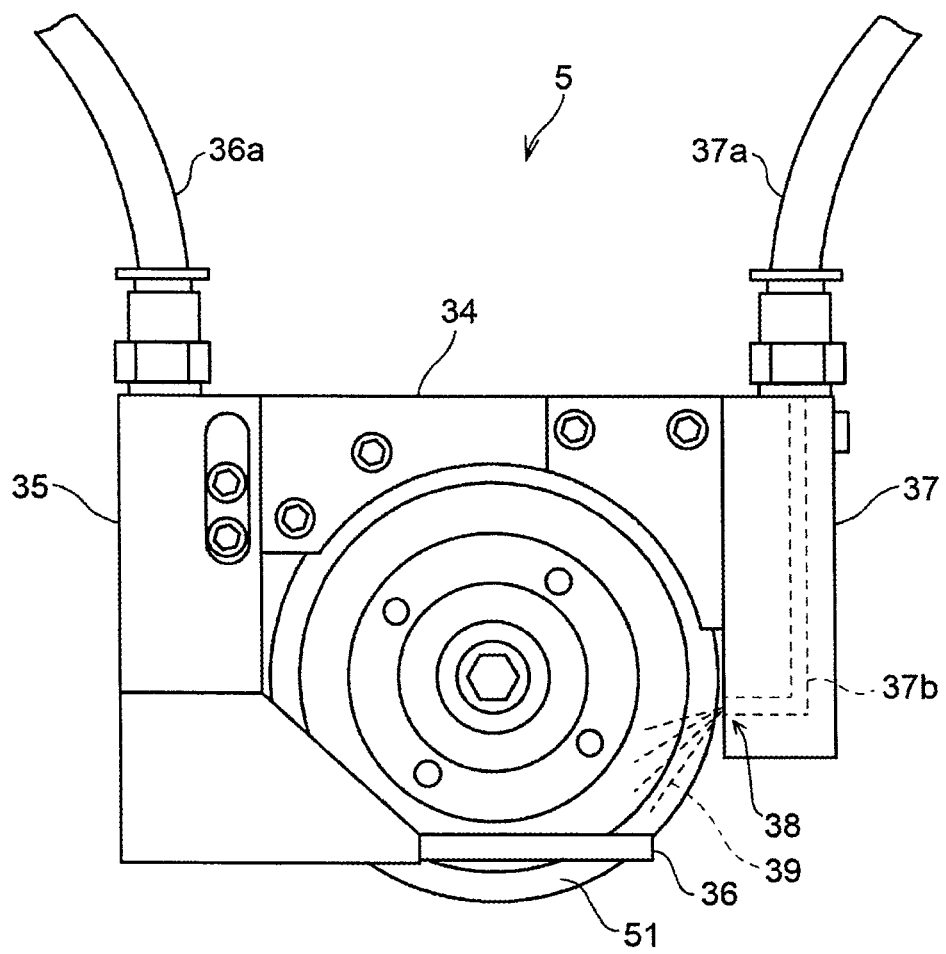
FIG. 3 is a front view depicting a configuration of a cutting unit.

FIG. 3 is a front view depicting a configuration of the cutting unit 5. The cutting unit 5 is for cutting the workpiece by the cutting blade 51 configured to be detachable. The cutting blade 51 is what is generally called a washer type blade, and includes an annular cutting edge in which abrasive grains are bound by a bonding material.

On the upper side of the cutting blade 51, a blade cover 34 covering an upper part of the cutting blade 51 is provided. A nozzle block 35 is provided on one side of the blade cover 34. At a lower part of the nozzle block 35, a pair of blade cooler nozzles 36 are provided in such a manner that both side surfaces in a rotational axis direction of the cutting blade 51 are interposed therebetween.

Note that only the blade cooler nozzle 36 on one side is depicted in FIG. 3. The blade cooler nozzles 36 are provided to extent horizontally, and are set at such a predetermined height as not to make contact with the upper surface of the workpiece, in a height direction (Z-axis direction) of the cutting apparatus.

The blade cooler nozzles 36 are connected to a cutting liquid supply source (not illustrated) that supplies a cutting liquid such as pure water, through a first tube 36a. Each blade cooler nozzle 36 supplies the cutting liquid to the cutting blade 51 during cutting of the workpiece.

In addition, on the other side of the blade cover 34, a shower nozzle block 37 is provided. A shower nozzle 38 (cutting liquid supply nozzle) that supplies the cutting liquid, denoted by 39, to an outer circumferential part of the cutting blade 51 is provided in the shower nozzle block 37. The shower nozzle 38 is connected to the cutting liquid supply source (not illustrated) that supplies the cutting liquid such as pure water, through a flow channel 37b provided in the shower nozzle block 37 and a second tube 37a provided at an upper part of the shower nozzle block 37.

Figure 4:
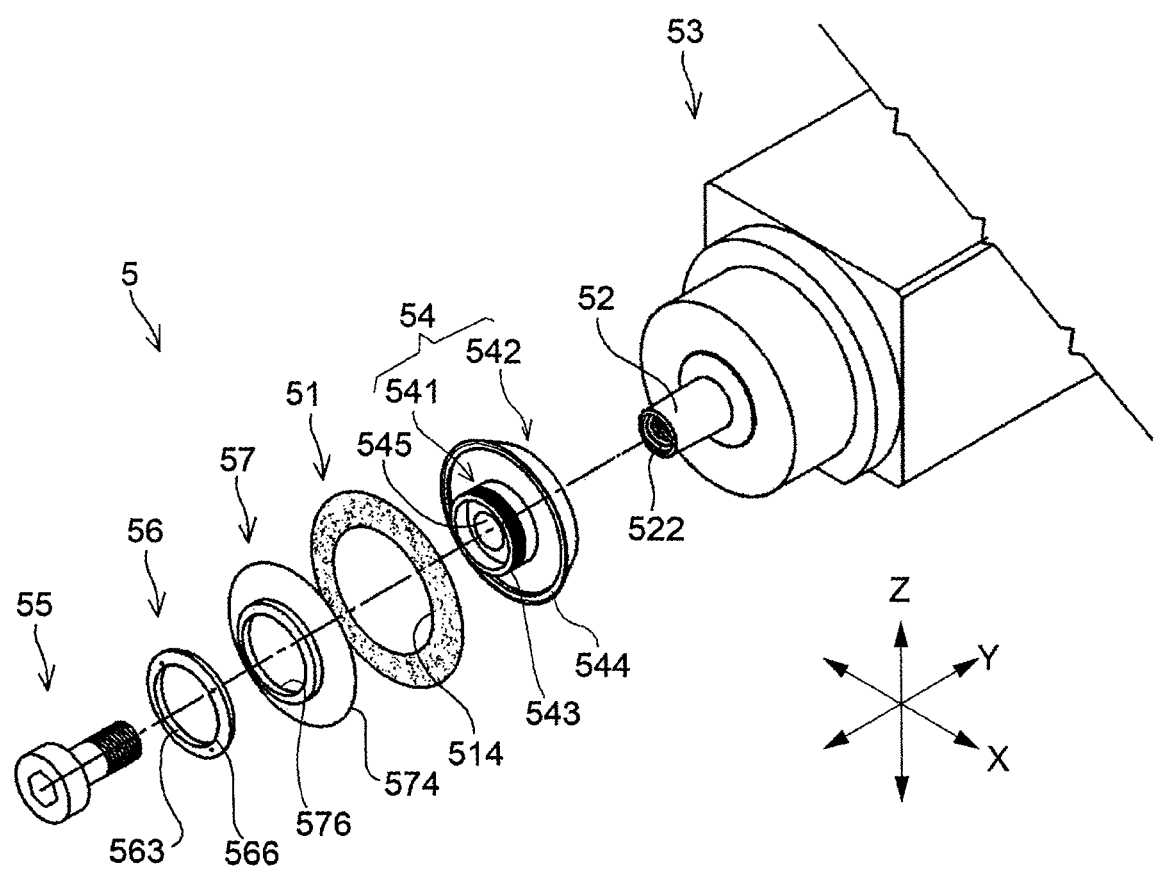
FIG. 4 is an exploded perspective view depicting a configuration of flanges for fixing a cutting blade.

FIG. 4 is an exploded perspective view depicting a configuration of flanges for fixing the cutting blade 51 of the cutting unit 5. A spindle housing 53 is fixed to a lower part of the Z-axis moving plate 4Z (FIG. 1), and a rear flange 54 is fixed to a tip part of the spindle 52 projected from the spindle housing 53. Between the rear flange 54 and a front flange 57, the cutting blade 51 is clamped and fixed.

The rear flange 54 includes a cylindrical boss section 541 and a flange section 542 provided at one end part on the spindle housing 53 side of the boss section 541. The flange section 542 is formed in a circular annular shape having a diameter larger than an outside diameter of the boss section 541, and an annular end face 544 for making contact with a rear surface 51b (FIG. 5) of the cutting blade 51 is formed at an outer circumferential part of the flange section 542. An outer circumference of the other end part of the boss section 541 of the rear flange 54 is formed with a male screw 543.

The rear flange 54 is formed with a through-hole 545 into which a tip part of the spindle 52 is inserted. The tip part of the spindle 52 is inserted into the through-hole 545, and a fixing bolt 55 is meshed with a female screw 522 provided at the tip part of the spindle 52, whereby the rear flange 54 is fixed to the spindle 52.

The cutting blade 51 is configured as what is generally called a washer blade, is configured in a predetermined thickness from abrasive grains of diamond, cubic boron nitride (CBN), or the like and a bonding material (binder) such as a metal, resin, or vitrified bonding material, and its outer circumferential part constitutes a cutting edge.

The cutting blade 51 is configured in a disk-like ring shape having a through-hole section 514, the cylindrical boss section 541 of the rear flange 54 is inserted into the through-hole section 514, and the rear surface of the cutting blade 51 is put into contact with the annular end face 544 formed on the front side of the rear flange 54.

The front flange 57 is configured by a disk-shaped member having a through-hole section 576, and the cylindrical boss section 541 of the rear flange 54 is inserted into the through-hole section 576. An annular end face 574 for making contact with a front surface 51a (FIG. 5) of the cutting blade 51 is formed on the rear side of the front flange 57.

A blade fixing nut 56 includes a circular annular member having a through-hole section 566, and a female screw 563 to be meshed with the male screw 543 of the boss section 541 of the rear flange 54 is formed on the inside of the through-hole section 566.

The cutting blade 51 and the front flange 57 are mounted to the rear flange 54 fixed to the spindle 52, the boss section 541 of the rear flange 54 is put into a state of projecting from the front flange 57, and the blade fixing nut 56 is fastened to the boss section 541, whereby the cutting blade 51 is clamped and fixed between the rear flange 54 and the front flange 57.

With the above-described configuration, as depicted in FIG. 1, provided is the cutting apparatus 1 that includes, at least, the spindle 52 with the cutting blade 51 fixed to the tip thereof, the cutting blade 51 having the annular cutting edge and cutting the workpiece W, the holding unit 2 that holds the workpiece W to be cut by the cutting blade 51 fixed to the tip of the spindle 52, and the shower nozzle 38 (FIG. 3) as the cutting liquid supply nozzle for supplying the cutting liquid to the cutting blade 51 during cutting of the workpiece W held by the holding unit 2. In addition, the flanges for fixing the cutting blade 51 to the spindle 52 include the front flange 57 and the rear flange 54 that clamp the cutting blade 51 therebetween.

Figure 5:
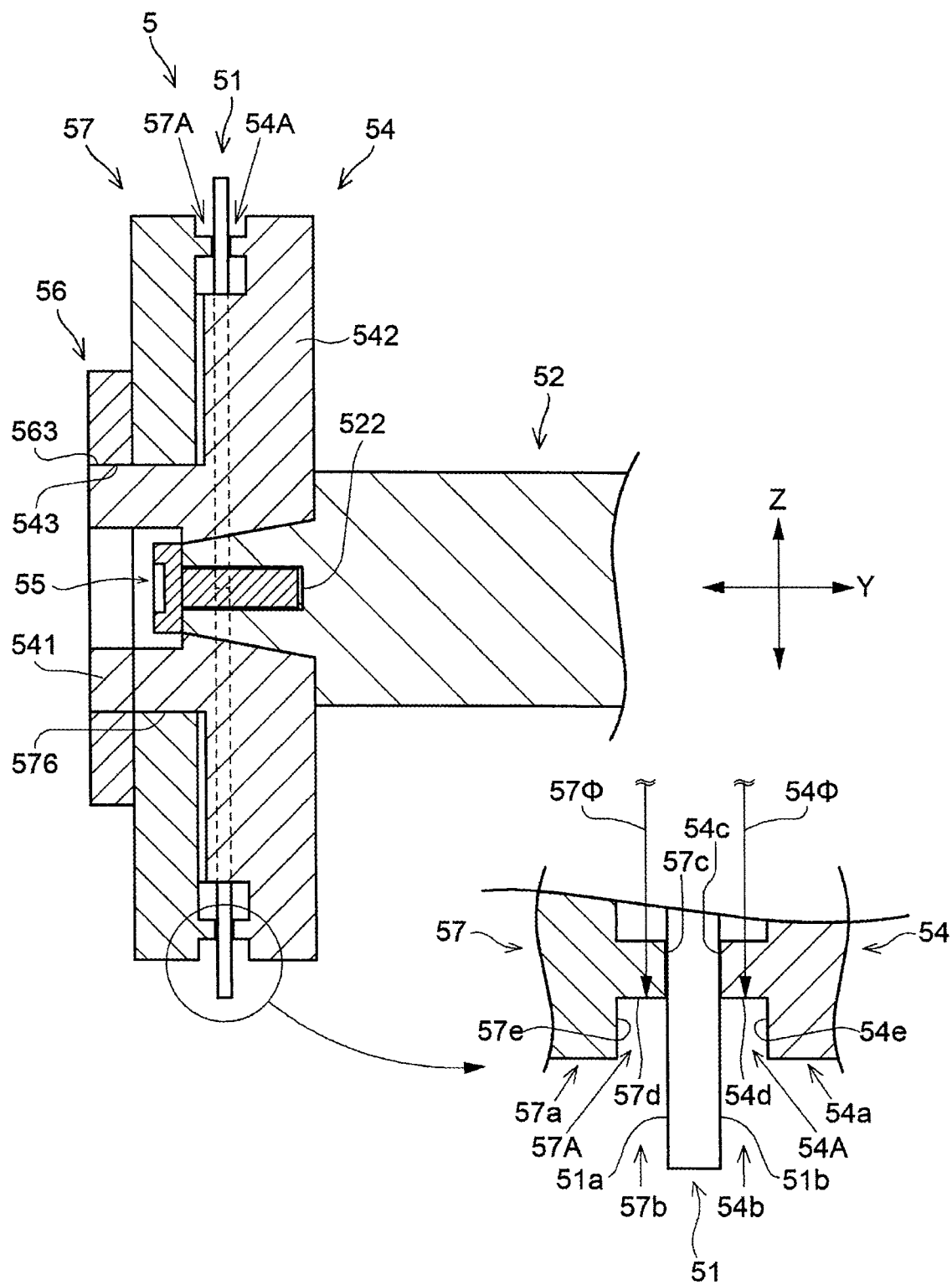
FIG. 5 is a sectional view depicting recessed spaces formed in the flanges.

As depicted in FIG. 5, the front flange 57 has a first outer circumferential part 57a smaller in diameter than the cutting blade 51 and a second outer circumferential part 57b smaller in diameter than the first outer circumferential part 57a. A clamping surface 57c making contact with a front surface 51a of the cutting blade 51 is formed at an end face of the second outer circumferential part 57b on the side opposite to the first outer circumferential part 57a. A diameter of an outer circumferential surface 57d of the second outer circumferential part 57b is configured to be the same in an axial direction of the front flange 57 (the Y-axis direction in FIG. 5), or is configured to be enlarged as the distance from the cutting blade 51 increases, as depicted in FIG. 7B.

As a result, a wall surface 57e opposed to the front surface 51a of the cutting blade 51 is formed between the first outer circumferential part 57a and the second outer circumferential part 57b, and a recessed space 57A surrounded by the wall surface 57e, the front surface 51a of the cutting blade 51, and the outer circumferential surface 57d of the second outer circumferential part 57b is formed in a circumferential direction of the front flange 57.

Similarly, the rear flange 54 has a first outer circumferential part 54a smaller in diameter than the cutting blade 51 and a second outer circumferential part 54b smaller in diameter than the first outer circumferential part 54a. A clamping surface 54c making contact with a rear surface 51b of the cutting blade 51 is formed at an end face of the second outer circumferential part 54b on the side opposite to the first outer circumferential part 54a. A diameter of an outer circumferential surface 54d of the second outer circumferential part 54 is configured to be the same in an axial direction of the rear flange 54 (the Y-axis direction in FIG. 5), or is configured to be enlarged as the distance from the cutting blade 51 increases, as depicted in FIG. 7B.

As a result, a wall surface 54e opposed to the rear surface 51b of the cutting blade 51 is formed between the first outer circumferential part 54a and the second outer circumferential part 54b, and a recessed space 54A surrounded by the wall surface 54e, the rear surface 51b of the cutting blade 51, and an outer circumferential surface 54d of the second outer circumferential part 54b is formed in a circumferential direction of the rear flange 54.

Figure 6:
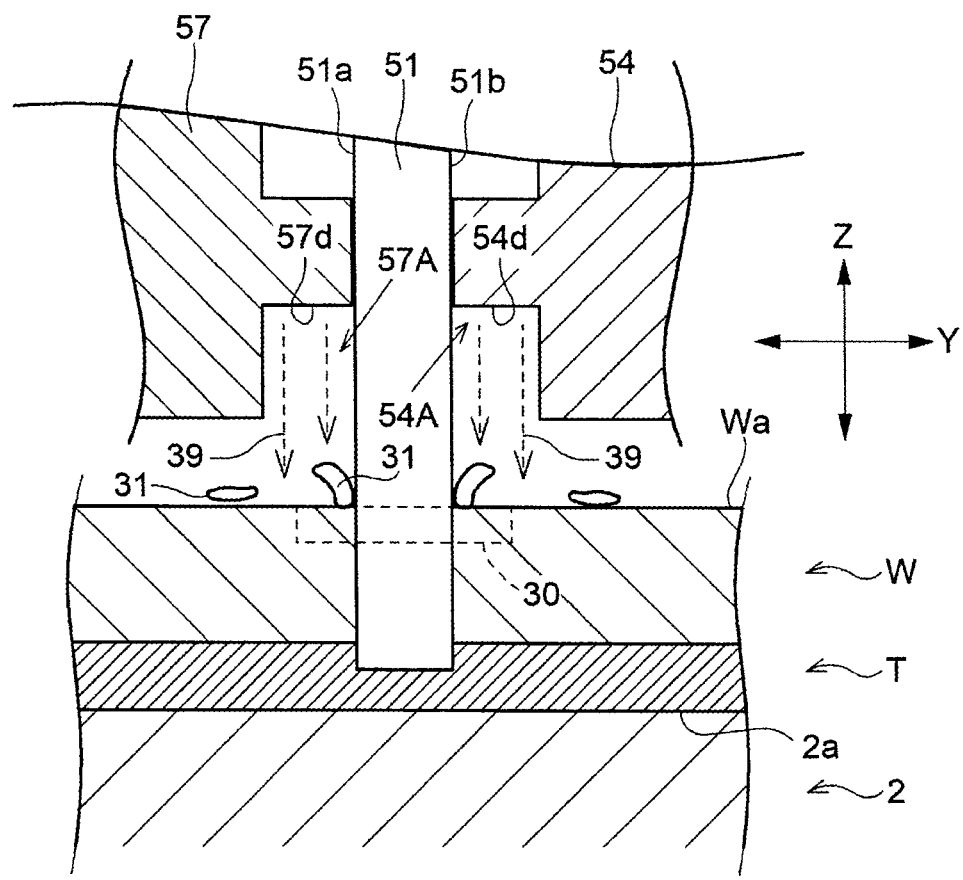
FIG. 6 is a sectional view depicting the manner in which a cutting liquid is supplied toward a cutting region.

As described above, the recessed spaces 57A are formed respectively along the circumferential direction on the front side and the rear side of an axial direction of the cutting blade 51 (the Y-axis direction in FIG. 5). In addition, as depicted in FIG. 6, the cutting liquid 39 supplied from the cutting liquid supply nozzle (shower nozzle 38 (FIG. 3)) to the outer circumferential part of the cutting blade 51 during cutting of the workpiece W enters the recessed space 57A and is then splashed back by the outer circumferential surface 57d, to be supplied toward a cutting region of an upper surface Wa of the workpiece W.

As a result, the cutting liquid 39 can efficiently be made to flow toward and collide against burrs 31 of the electrodes 30, the burrs 31 being generated by cutting, and the burrs 31 can be separated and removed from the upper surface Wa of the workpiece W.

Figure 7A:
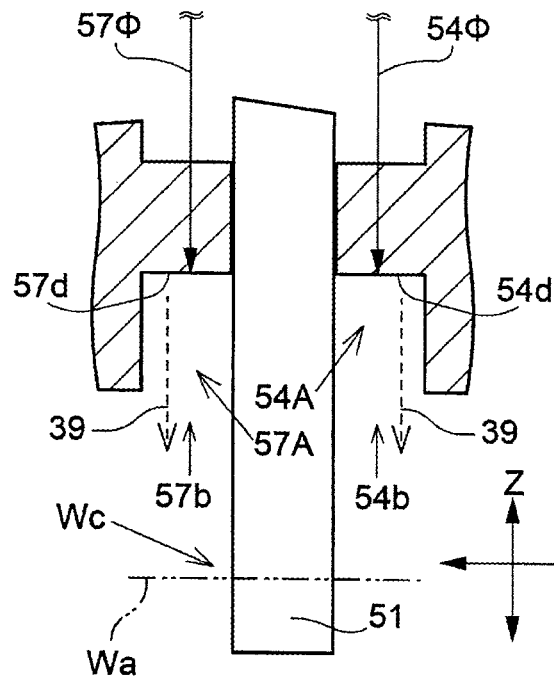
FIG. 7A is a sectional view depicting the configuration of the flanges according to one embodiment of the present invention.
Figure 7B:
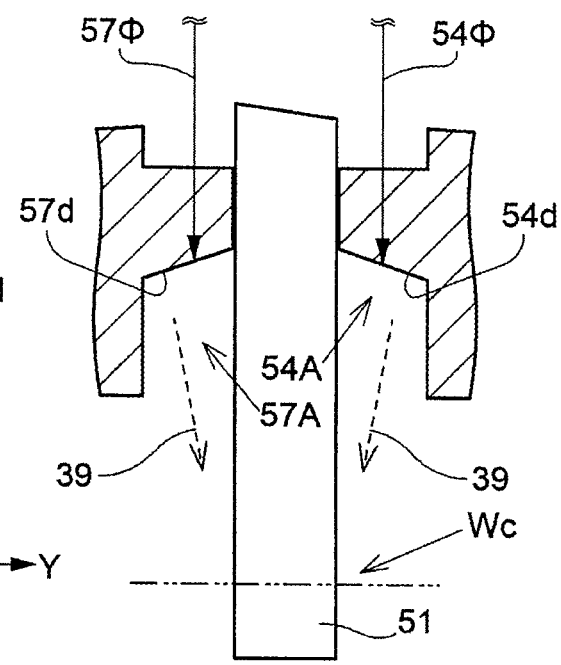
FIG. 7B is a sectional view depicting a configuration of the flanges according to a modification of the one embodiment of the present invention.

Here, as depicted in FIG. 7A, a diameter 54φ of the outer circumferential surface 54d of the second outer circumferential part 54b of the rear flange 54 is preferably configured to be the same in the axial direction of the rear flange 54 (the Y-axis direction). This applies also to the front flange 57. In the example of FIG. 7A, the outer circumferential surface 54d horizontally flat in side view is formed, and the manner in which the outer circumferential surface 54d is substantially parallel to the upper surface Wa of the workpiece W, that is, the holding surface 2a (FIG. 5) of the holding unit 2 is depicted.

In this way, according to a configuration depicted in FIG. 7A, the cutting liquid 39 entering the recessed space 54A and splashed back by the outer circumferential surface 54d is guided in such a manner as to go outward along the radial direction of each flange, so that the cutting liquid 39 can be prevented from being scattered away from the cutting blade 51.

Alternatively, as depicted in FIG. 7B, the diameter 54φ of the outer circumferential surface 54d of the second outer circumferential part 54b of the rear flange 54 is preferably configured to be enlarged as the distance from the cutting blade 51 increases. This applies also to the front flange 57. In the example of FIG. 7B, the manner in which the outer circumferential surface 54d inclined such that the diameter 54φ is enlarged as the distance from the cutting blade 51 increases in side view is formed is depicted.

In this way, according to a configuration depicted in FIG. 7B, the cutting liquid 39 entering the recessed space 54A and splashed back by the outer circumferential surface 54d is guided outward in the radial direction of each flange and toward the cutting blade 51, so that it is possible to prevent the cutting liquid 39 from being scattered away from the cutting blade 51.

As described above, according to the configurations depicted in FIGS. 7A and 7B, the cutting liquid 39 can be prevented from being scattered away from the cutting blade 51, whereby it is possible to supply a larger amount of the cutting liquid 39 toward a cutting region We and separate and remove the burrs 31 (FIG. 6) more effectively during cutting.

Figure 7C:
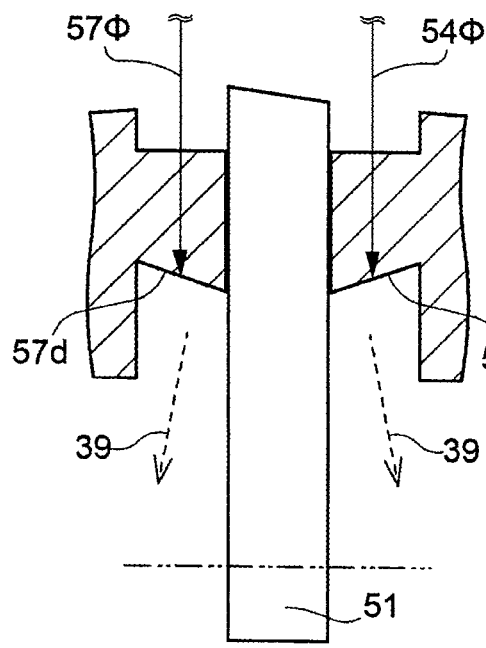
FIG. 7C is a sectional view depicting a configuration of flanges according to a comparative example not included in the present invention.

Note that FIG. 7C does not depict a configuration of the present invention but depicts an example of a configuration in which the diameter 54φ of the outer circumferential surface 54d is reduced as the distance from the cutting blade 51 increases, and, in this configuration, the cutting liquid 39 is splashed back away from the cutting blade 51, so that there is a fear of weakening of the effect of separating and removing the burrs 31 (FIG. 6).

Figure 7D:
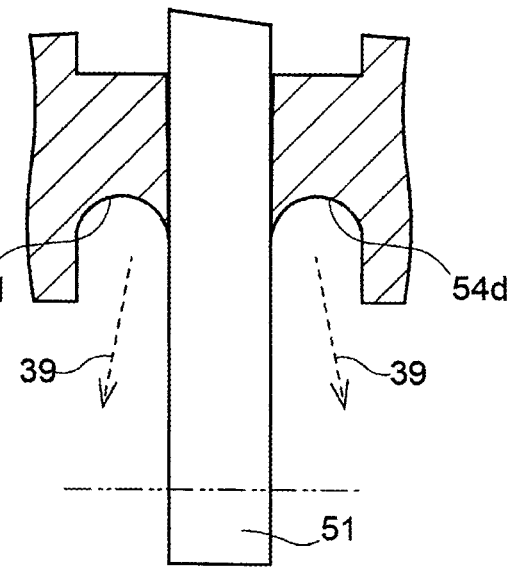
FIG. 7D is a sectional view depicting a configuration of flanges according to another comparative example not included in the present invention.

In addition, the example depicted in FIG. 7D also does not depict a configuration of the present invention but depicts an example of a configuration in which the outer circumferential surface 54d is a U-shaped arc, and, also in this configuration, as in the example depicted in FIG. 7C, the cutting liquid 39 is splashed back away from the cutting blade 51, so that there is little contribution to separation and removal of the burrs 31 (FIG. 6) by supplying the cutting liquid 39.

Figure 8:
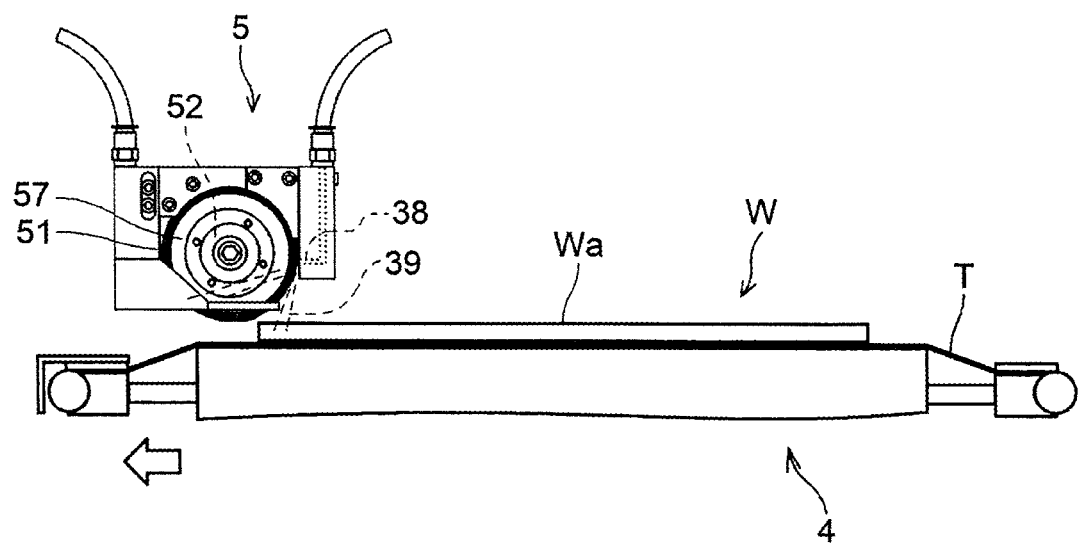
FIG. 8 is a front view depicting a cutting method.

By use of the above-described configuration of the flanges, a cutting method as follows can be carried out. In other words, as depicted in FIGS. 6 and 8, the cutting blade 51 is clamped between the flanges including the front flange 57 and the rear flange 54 for clamping the cutting blade 51 therebetween and is fixed to the tip of the spindle 52, the workpiece W is held by the holding unit 2, the cutting liquid 39 is supplied from the cutting liquid supply nozzle (shower nozzle 38 (FIG. 3)) to the cutting blade 51, and the cutting blade 51 is moved relative to the workpiece W held by the holding unit 2, thereby cutting the workpiece W by the cutting blade 51.

In this cutting method, as depicted in FIG. 6, the recessed spaces 57A are formed in the circumferential direction of the flanges on both sides of the cutting blade 51, whereby the cutting liquid 39 enters into the recessed spaces 57A and is hardly scattered sideways. As a result, a larger amount of the cutting liquid 39 can be supplied toward the cutting region (the region proximate to the cutting position of the cutting blade 51) where cutting by the cutting blade 51 is conducted, and the burrs 31 can be separated and removed more effectively during cutting.

In addition, with the above-described configuration of the flanges, removal of the burrs generated during electrode cutting in the cutting of a package substrate is effectively performed, and, also in the case of cutting a workpiece to which contaminants such as cutting swarf is liable to be adhered and which is difficult to clean after processing, such as a semiconductor wafer formed with imaging element devices, the cutting liquid can efficiently be supplied to the cutting region, thereby enhancing the cleaning effect in the cutting region. In this way, shortening of the time of cleaning for the purpose of removing the burrs and cutting swarf can be realized.

Figure 9:
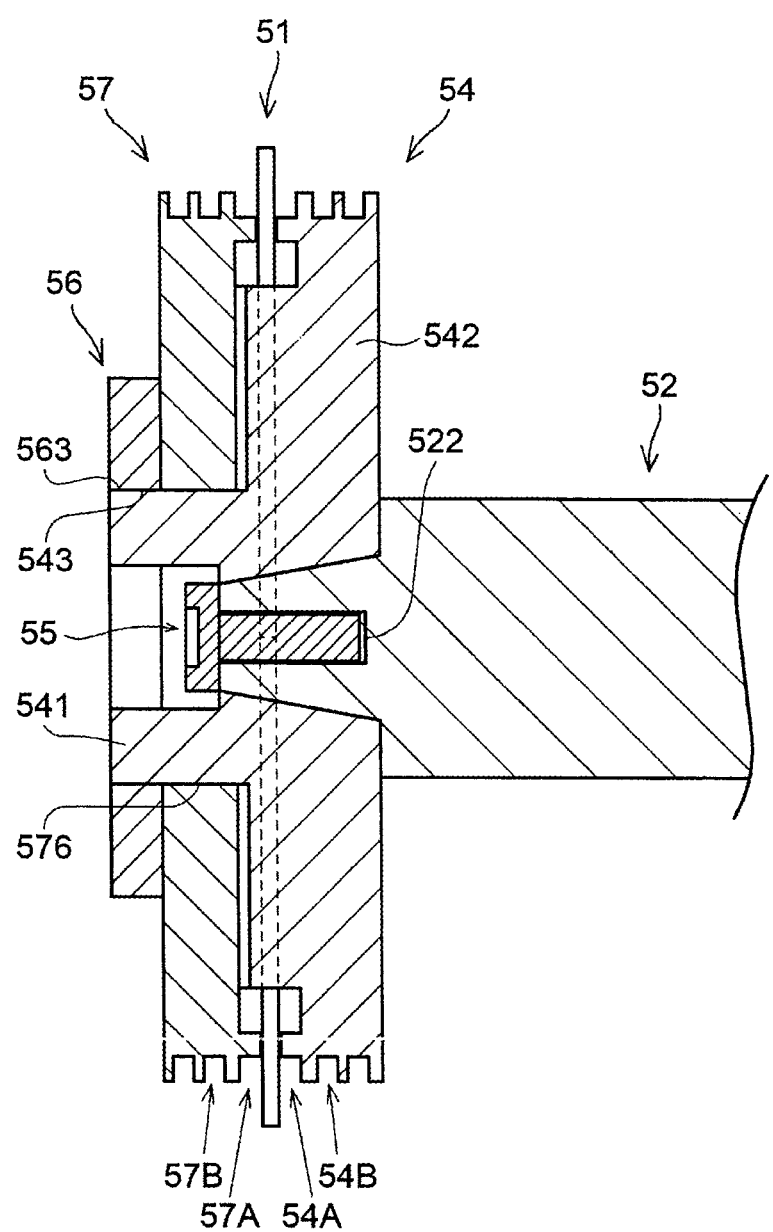
FIG. 9 is a sectional view depicting a configuration of flanges according to another embodiment of the present invention.

Further, as depicted in FIG. 9, a configuration in which, in addition to the recessed spaces 57A formed on both sides of the cutting blade 51, a recessed space 57B is additionally provided at an outer circumferential part of each flange may be adopted.

According to this configuration, the cutting liquid having entered into the recessed spaces 57B can be radially splashed back to be supplied to the upper surface of the workpiece, and the cleaning effect on the upper surface of the workpiece can be enhanced.

In addition, other than the provision of the recessed spaces 57A at both of the front and rear flanges, a configuration in which the recessed space is formed at either one of the flanges may be adopted.

The present invention is not limited to the details of the above described preferred embodiments. The scope of the invention is defined by the appended claim and all changes and modifications as fall within the equivalence of the scope of the claim are therefore to be embraced by the invention.

What is claimed is:

1. A flange for fixing a cutting blade to a spindle in a cutting apparatus that includes the spindle with the cutting blade fixed to a tip thereof, the cutting blade having an annular cutting edge, a holding unit which holds a workpiece to be cut by the cutting blade fixed to the tip of the spindle, and a cutting liquid supply nozzle which supplies a cutting liquid to the cutting blade during cutting of the workpiece held by the holding unit, the flange comprising:

a front flange and a rear flange that clamp the cutting blade therebetween, wherein the front flange has a first outer circumferential part smaller in diameter than the cutting blade and a second outer circumferential part smaller in diameter than the first outer circumferential part, a clamping surface making contact with a front surface of the cutting blade is formed at an end face of the second outer circumferential part on a side opposite to the first outer circumferential part, and a diameter of an outer circumferential surface of the second outer circumferential part is configured to be same in an axial direction of the front flange or is configured to be enlarged as a distance from the cutting blade increases, and the rear flange has a first outer circumferential part smaller in diameter than the cutting blade and a second outer circumferential part smaller in diameter than the first outer circumferential part, a clamping surface making contact with a rear surface of the cutting blade is formed at an end face of the second outer circumferential part on a side opposite to the first outer circumferential part, and a diameter of an outer circumferential surface of the second outer circumferential part is configured to be same in an axial direction of the rear flange or is configured to be enlarged as a distance from the cutting blade increases,
whereby, at a time when the cutting blade is clamped between the front flange and the rear flange, recessed spaces are formed on both sides of the cutting blade along a circumferential direction of the front flange and the rear flange, and the cutting liquid supplied from the cutting liquid supply nozzle to the cutting blade is splashed back in the recessed spaces to be supplied to a cutting region of an upper surface of the workpiece.

\* \* \* \* \*